UNITED STATES PATENT OFFICE.

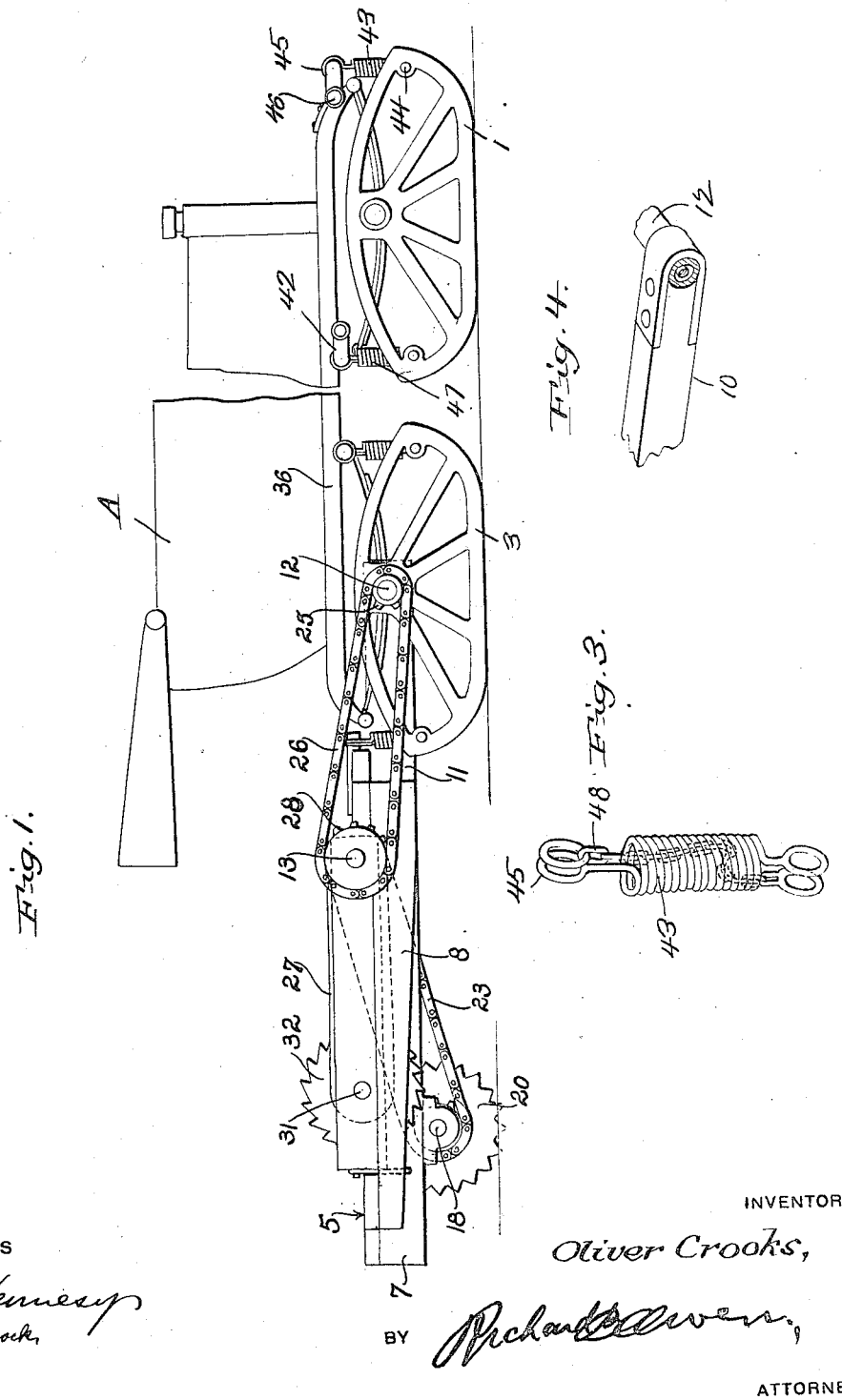

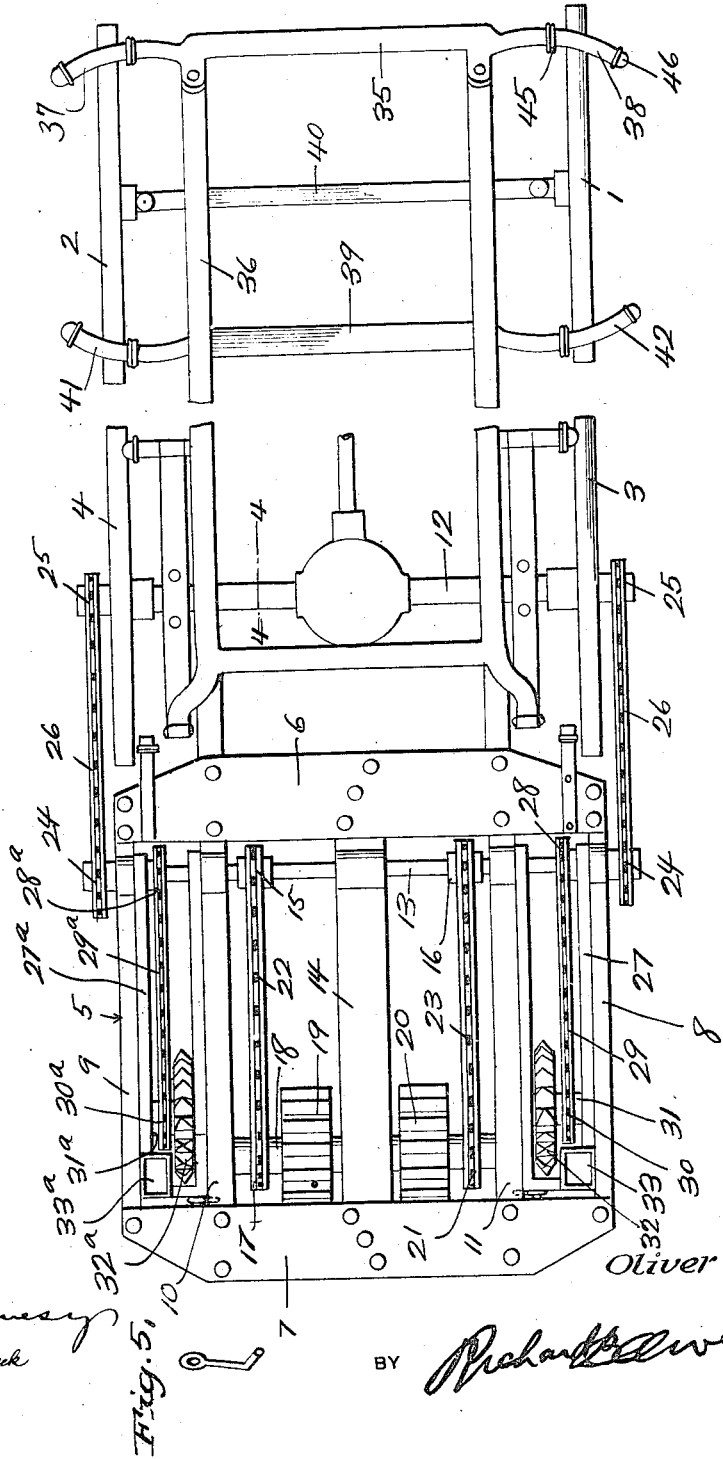

OLIVER CROOKS, OF MINNEAPOLIS, MINNESOTA.

SLEIGH.

1,267,385.

Specification of Letters Patent.

Patented May 28, 1918.

Application filed August 1, 1917. Serial No. 183,944.

*To all whom it may concern:*

Be it known that I, OLIVER CROOKS, a citizen of the United States, residing at Minneapolis, in the county of Hennepin and State of Minnesota, have invented certain new and useful Improvements in Sleighs, of which the following is a specification.

This invention relates to automobile sleighs, and more particularly to mechanism adapted to be applied to an automobile so as to be operated directly from the engine thereof and having two drive wheels for propelling the vehicle.

One of the main objects of the invention is to provide a mechanism of comparatively simple construction which can be readily applied to an automobile of standard construction. A further object is to provide a frame readily attachable to the rear axle housing of an automobile, this frame being provided with main toothed drive wheels adapted to engage the snow or icy surface over which the vehicle is to be propelled. A further object is to provide supplemental drive wheels which may be readily lowered into engagement with the surface over which the vehicle is driven when traveling up steep grades or over uneven surfaces. Further objects will appear from the detailed description.

In the drawings:—

Figure 1 is a side view of an automobile sleigh constructed in accordance with my invention.

Fig. 2 is a top plan view of the same, the engine and body of the automobile being removed.

Fig. 3 is a detail of the means for connecting the runners to the automobile frame so as to prevent excessive play thereof.

Fig. 4 is a detail section taken substantially on line 4—4 of Fig. 2.

Fig. 5 is a detail of the means for holding the supplemental drive wheels in raised or inoperative position.

In constructing my sleigh, an automobile A of any suitable standard construction may be used, the front wheels being replaced by the runners 1 and 2, and the rear wheels replaced by the runners 3 and 4. A substantially rectangular frame designated generally by 5 is mounted in rear of the automobile. This frame is provided with the front bar 6, back bar 7, and side bars 8 and 9. Suitable connecting beams 10 and 11 are secured to frame 5 and extend longitudinally of the same parallel with the side bars 9 and 8, respectively. Beams 10 and 11 project forwardly of frame 5 beneath the body of the automobile, the forward ends of these beams being loosely secured about the axle housings or casings 12. By this means, frame 5 is secured to the rear axle of the automobile so as to be rockable about the same.

A transverse shaft 13 is rotatably mounted in the side bars 8 and 9, and beams 10 and 11 and center beam 14 of the frame 5 in parallelism with, and adjacent to, front bar 6. This shaft is provided with sprocket wheels 15 and 16 secured thereon adjacent beams 10 and 11, respectively. Sprocket wheel 15 is in alinement with a sprocket 17 secured on a counter-shaft 18 rotatably mounted in beams 10, 11 and 14 in parallelism with and adjacent the rear end bar 7. A toothed main drive wheel 19 is secured on shaft 18 intermediate sprocket 17 and beam 14. A similar drive wheel 20 is secured on shaft 18 intermediate beam 14 and a sprocket 21 secured on the shaft in alinement with sprocket wheel 16. Sprocket wheel 15 is operatively connected by chain 22 to sprocket 17, sprocket wheel 16 being similarly connected to sprocket 21 by a chain 23. Shaft 13 is provided, at each end, with a sprocket wheel 24 secured thereon which is in alinement with a sprocket wheel 25 secured on the end of the rear axle of the automobile so as to rotate therewith, the sprockets 24 and 25 being operatively connected by a chain 26. By this arrangement, when the rear axle of the automobile is rotated, in the usual manner, this rotation will be imparted to the toothed main drive wheels 19 and 20. These drive wheels are normally held down in close biting engagement with the snow or ice over which the vehicle travels by the weight or pressure of frame 5. By this construction, the main drive wheels 19 and 20 will act to force the vehicle forward at a relatively high speed. Of course, by reversing the direction of drive of the automobile engine, the vehicle may be moved rearwardly when desired.

A substantially U-shaped frame 27 is mounted intermediate side bar 8 and beam 11. This frame is loosely secured at its forward end on shaft 13 so as to be rockable about the frame. A sprocket wheel 28 is secured on shaft 13 intermediate the arms of frame 27 and is operatively connected by chain 29 to a sprocket wheel 30 secured on the stub shaft 31 rotatably mounted in the frame. A toothed supplemental drive wheel 32 is secured on the stub shaft so as to rotate when shaft 13 is driven. This frame 27 is further provided, at its outer corner, with a weight box or receptacle 33. A frame 27ª similar to frame 27 is rockably secured at its forward end to shaft 13, this latter frame being positioned intermediate side bar 9 and beam 10. A cog wheel 28ª is secured on shaft 13 and is connected by a chain 29ª to a cog 30 secured on a stub shaft 31ª mounted in the frame on which is also secured a toothed supplemental drive wheel 32ª. This frame 27ª is provided with a weight box 33ª. The frames 27 and 27ª are normally maintained in raised position by means of a hook secured to the rear end bar 7 of the frame 5 and engaging into an eye carried by the supplemental gear frame. When traveling on a level surface, or over a smooth surface which has very little grade, the main drive wheels 19 and 20 will be sufficient to propel the vehicle. In the event that a steep grade is encountered, the frames 27 and 27ª may be lowered so as to bring the supplemental drive wheels 32 and 32ª into operative position. These supplemental drive wheels provide additional traction or gripping members for driving the vehicle, and are sufficient to enable the sleigh to travel up very steep grades. In addition, the supplemental frames are independently rockable about the shaft 13 so as to readily adapt themselves to any unevenness in the surface upon which the sleigh is traveling. Because of their independent mounting on shaft 13, the supplemental drive wheels are also very useful in assisting to propel the vehicle over uneven surfaces, as the frames carrying these members are free to rise and fall independently of each other thus insuring that the supplemental drive wheels will at all times tightly grip the traction surface. In the event that the supplemental frames 27 and 27ª are not sufficiently heavy to maintain the supplemental drive wheels in tight contact with the traction surface, weights may be placed in the weight boxes thus insuring that these members will be held tightly in operative engagement with the snow or icy surface over which the sleigh travels.

The frame 5 and the propelling or driving elements carried thereby may be readily attached to an automobile of standard construction without necessitating any extensive changes in the vehicle. I thus provide a mechanism of comparatively simple construction and operation by means of which a motor vehicle of standard construction may be readily and easily converted into a motor sleigh which is capable of traveling on practically any surface of snow or ice, and is well adapted for ascending very steep grades.

The front runners 1 and 2 are rockably mounted on the front wheel spindles, the back runners 3, and 4 being similarly mounted on the rear axle. A front bar 35 is secured to the front of the frame 36 and is provided, at one end, with an arched arm 37 curved on an arc struck from the center of the steering spindle, bar 35 being provided with a similar arm 38 at its other end, and bar 37 is secured to frame 36 in rear of the front axle 40, the bars 35 and 39 being equidistant from this axle. Bar 39 is provided at one end with an arm 41 which is curved on an arc struck from the center of the steering spindle, a similar arm 42 being provided at the other end of bar 39. A coiled tension spring 43 has its lower end secured to the front of runner 1 as at 44. This spring is provided at its upper end with an eye 45 which fits about arm 38 so as to be slidable thereon, a suitable head or knob 46 being secured on the outer end of arm 38 so as to positively prevent removal of the ring 45. A tension coil spring 47 is similarly secured to the rearward end of runner 1 and to arm 42. These springs act to normally maintain the runner in a substantially horizontal position, as shown. The other front runner 2, and the rear runners 3 and 4 are similarly secured to the vehicle frame. When the vehicle is traveling over rough or uneven surfaces the runners will have a rocking movement about the rear axle and wheel spindles so as to accommodate the unevenness of the traction surface. When the front end of the runner encounters an obstacle it will rise against the tension of the spring secured to the back end of the runners. When the object is in rear of center of the runner the forward end of the runner will tilt downward so as to tension the front spring, this tilting or rocking movement of the runner being in turn assisted and cushioned by the action of the springs. This insures smooth and easy operation of the runners and prevents all unnecessary shocks or jars. To prevent excessive movement between the vehicle body and the runners, a chain 48 is secured at one end to the runner and at the other end to the vehicle frame. This chain serves to positively limit the relative movement between the vehicle body and runners while permitting sufficient movement between these members to insure smooth easy riding of the vehicle. By having the arms for the springs of the front runners curved on arc struck on the front spindles 1 insures that the steering of these runners by means of the usual gearing steer will not be interfered with while the tension springs will be at all times properly spaced from the wheel spindles so as to insure proper operation of the same.

What I claim is:—

1. In automobile sleighs, the combination with an automobile, of a frame mounted in rear thereof and having forwardly projecting beams loosely secured at their forward ends about the housings of the rear axle of the automobile, toothed drive wheels carried by said frame and projecting below the same, supplemental drive wheels carried by the frame and mounted therein for vertical movement independently of the frame and of each other, and means for operatively connecting the main drive wheels and the supplemental drive wheels to the rear axle of the automobile so as to be rotated thereby.

2. In automobile sleighs, the combination with an automobile, of a main frame mounted in rear thereof and having forwardly projecting beams loosely secured at their forward ends about the housings of the rear axle of the automobile, toothed main drive wheels carried by said frame and projecting below the same, supplemental frames loosely secured at their forward ends to the main frame adjacent each side thereof, supplemental drive wheels carried by the supplemental frames, and driving connections between the main and supplemental drive wheels and the rear axle of the automobile.

3. In automobile sleighs, the combination with an automobile, of a main frame mounted in rear thereof and having forwardly projecting beams loosely secured at their forward ends about the housings of the rear axle of the automobile, a drive-shaft rotatably mounted therein, means for operatively connecting said drive shaft to the rear axle of the automobile so as to be rotated thereby, a counter shaft mounted in the rear of said drive shaft, driving connections between said shafts, main drive wheels secured on said counter shaft and projecting below the frame, supplemental frames carried by the main frame adjacent each side thereof loosely secured at their forward ends about the drive shaft, supplemental drive wheels carried by said supplemental frames and driving connections between said drive shaft and the supplemental drive wheels.

4. An attachment for automobiles comprising a main frame adapted to be secured at its forward end to the rear axle housing of an automobile, a drive shaft mounted in said main frame, a counter shaft mounted in the frame in rear of said drive shaft, driving connections between said shafts, main drive wheels secured on the counter shaft and projecting below the main frame, supplemental frames mounted adjacent each side of said main frame and having their forward ends loosely secured about the drive shaft, supplemental drive wheels in said supplemental frames, and driving connections between the said supplemental drive wheels and the drive shaft.

In testimony whereof I affix my signature in presence of two witnesses.

OLIVER CROOKS.

Witnesses:
JESSIE CAREY SMITH,
CHARLES GEIGER.

Copies of this patent may be obtained for five cents each, by addressing the "Commissioner of Patents, Washington, D. C."